United States Patent [19]

Tulpule et al.

[11] 4,139,899
[45] Feb. 13, 1979

[54] SHIFT NETWORK HAVING A MASK GENERATOR AND A ROTATOR

[75] Inventors: Bhalchandra R. Tulpule, Storrs, Conn.; Daniel D. Gajski, Philadelphia, Pa.

[73] Assignee: Burroughs Corporation, Detroit, Mich.

[21] Appl. No.: 733,055

[22] Filed: Oct. 18, 1976

[51] Int. Cl.$^2$ .......................... G06F 7/00; G11C 19/00
[52] U.S. Cl. ................................................. 364/900
[58] Field of Search ... 364/900 MS File, 200 MS File; 307/207, 213, 221 R

[56] References Cited

U.S. PATENT DOCUMENTS

| | | | |
|---|---|---|---|
| 2,930,028 | 3/1960 | Johnson et al. | 364/900 |
| 3,360,779 | 12/1967 | Ulrich | 364/200 |
| 3,360,780 | 12/1967 | Fabisch | 364/200 |
| 3,370,274 | 2/1968 | Kettley et al. | 364/200 |
| 3,395,396 | 7/1968 | Pasternak | 364/900 |
| 3,430,202 | 2/1969 | Downing et al. | 364/200 |
| 3,543,245 | 11/1970 | Nutter | 364/200 |
| 3,553,652 | 1/1971 | Hanson | 364/900 |
| 3,571,803 | 3/1971 | Huttenhoff et al. | 364/900 |
| 3,747,070 | 7/1973 | Huttenhoff | 364/900 |
| 3,906,459 | 9/1975 | Desmonds et al. | 364/900 |
| 3,911,405 | 10/1975 | Sipple | 364/200 |
| 3,961,750 | 6/1976 | Dao | 364/900 |
| 3,969,704 | 7/1976 | Liebel, Jr. | 364/900 |
| 3,982,229 | 9/1976 | Rouse et al. | 364/200 |
| 4,012,722 | 3/1977 | Gajski et al. | 364/900 |
| 4,023,023 | 5/1977 | Bourrez et al. | 364/200 |
| 4,085,447 | 4/1978 | Pertl et al. | 364/900 |

OTHER PUBLICATIONS

"Slice Processor Family will Use ECL Technology to Increase System Speed" in Computer Design, vol. 15, No. 8, Aug. 1976, pp. 124, 126.

Primary Examiner—Melvin B. Chapnick
Attorney, Agent, or Firm—Edward J. Feeney, Jr.; Edmund M. Chung; Leonard C. Brenner

[57] ABSTRACT

In a network for transferring a source field in a source word into a destination field in a destination word two basic hardware sub-functions are utilized: rotation and mask vector generation. In the network the destination field of a destination word is masked. Concurrently in the network, a source word is rotated bringing the source field thereof into corresponding alignment with the masked destination field and all but the source field of the source word is masked. Subsequent logical combining of the masked destination word and the rotated and masked source word generates the desired field transference. In one embodiment the required masking operation is accomplished during a single pass of the destination and source words through the network. In an alternate embodiment using less masking hardware only half of the required masking is accomplished during each pass and two passes are required before the logical combining to achieve the desired field transference.

3 Claims, 13 Drawing Figures

| TYPE | INPUTS | | | | | | OUTPUTS | | | | | | | | | | | | | | | |
|---|---|---|---|---|---|---|---|---|---|---|---|---|---|---|---|---|---|---|---|---|---|---|
| | $E_1$ | $E_2$ | $A_3$ | $A_2$ | $A_1$ | $A_0$ | $M_0$ | $M_1$ | $M_2$ | $M_3$ | $M_4$ | $M_5$ | $M_6$ | $M_7$ | $M_8$ | $M_9$ | $M_{10}$ | $M_{11}$ | $M_{12}$ | $M_{13}$ | $M_{14}$ | $M_{15}$ |
| COMPLEMENT MASK VECTOR | 0 | 0 | X | X | X | X | 0 | 0 | 0 | 0 | 0 | 0 | 0 | 0 | 0 | 0 | 0 | 0 | 0 | 0 | 0 | 0 |
| | 0 | 1 | 0 | 0 | 0 | 0 | 1 | 1 | 1 | 1 | 1 | 1 | 1 | 1 | 1 | 1 | 1 | 1 | 1 | 1 | 1 | 1 |
| | 0 | 1 | 0 | 0 | 0 | 1 | 0 | 1 | 1 | 1 | 1 | 1 | 1 | 1 | 1 | 1 | 1 | 1 | 1 | 1 | 1 | 1 |
| | 0 | 1 | 0 | 0 | 1 | 0 | 0 | 0 | 1 | 1 | 1 | 1 | 1 | 1 | 1 | 1 | 1 | 1 | 1 | 1 | 1 | 1 |
| | 0 | 1 | 0 | 0 | 1 | 1 | 0 | 0 | 0 | 1 | 1 | 1 | 1 | 1 | 1 | 1 | 1 | 1 | 1 | 1 | 1 | 1 |
| | 0 | 1 | 0 | 1 | 0 | 0 | 0 | 0 | 0 | 0 | 1 | 1 | 1 | 1 | 1 | 1 | 1 | 1 | 1 | 1 | 1 | 1 |
| | 0 | 1 | 0 | 1 | 0 | 1 | 0 | 0 | 0 | 0 | 0 | 1 | 1 | 1 | 1 | 1 | 1 | 1 | 1 | 1 | 1 | 1 |
| | 0 | 1 | 0 | 1 | 1 | 0 | 0 | 0 | 0 | 0 | 0 | 0 | 1 | 1 | 1 | 1 | 1 | 1 | 1 | 1 | 1 | 1 |
| | 0 | 1 | 0 | 1 | 1 | 1 | 0 | 0 | 0 | 0 | 0 | 0 | 0 | 1 | 1 | 1 | 1 | 1 | 1 | 1 | 1 | 1 |
| | 0 | 1 | 1 | 0 | 0 | 0 | 0 | 0 | 0 | 0 | 0 | 0 | 0 | 0 | 1 | 1 | 1 | 1 | 1 | 1 | 1 | 1 |
| | 0 | 1 | 1 | 0 | 0 | 1 | 0 | 0 | 0 | 0 | 0 | 0 | 0 | 0 | 0 | 1 | 1 | 1 | 1 | 1 | 1 | 1 |
| | 0 | 1 | 1 | 0 | 1 | 0 | 0 | 0 | 0 | 0 | 0 | 0 | 0 | 0 | 0 | 0 | 1 | 1 | 1 | 1 | 1 | 1 |
| | 0 | 1 | 1 | 0 | 1 | 1 | 0 | 0 | 0 | 0 | 0 | 0 | 0 | 0 | 0 | 0 | 0 | 1 | 1 | 1 | 1 | 1 |
| | 0 | 1 | 1 | 1 | 0 | 0 | 0 | 0 | 0 | 0 | 0 | 0 | 0 | 0 | 0 | 0 | 0 | 0 | 1 | 1 | 1 | 1 |
| | 0 | 1 | 1 | 1 | 0 | 1 | 0 | 0 | 0 | 0 | 0 | 0 | 0 | 0 | 0 | 0 | 0 | 0 | 0 | 1 | 1 | 1 |
| | 0 | 1 | 1 | 1 | 1 | 0 | 0 | 0 | 0 | 0 | 0 | 0 | 0 | 0 | 0 | 0 | 0 | 0 | 0 | 0 | 1 | 1 |
| | 0 | 1 | 1 | 1 | 1 | 1 | 0 | 0 | 0 | 0 | 0 | 0 | 0 | 0 | 0 | 0 | 0 | 0 | 0 | 0 | 0 | 1 |
| MASK VECTOR | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| | 1 | 0 | 0 | 0 | 0 | 1 | 1 | 0 | 0 | 0 | 0 | 0 | 0 | 0 | 0 | 0 | 0 | 0 | 0 | 0 | 0 | 0 |
| | 1 | 0 | 0 | 0 | 1 | 0 | 1 | 1 | 0 | 0 | 0 | 0 | 0 | 0 | 0 | 0 | 0 | 0 | 0 | 0 | 0 | 0 |
| | 1 | 0 | 0 | 0 | 1 | 1 | 1 | 1 | 1 | 0 | 0 | 0 | 0 | 0 | 0 | 0 | 0 | 0 | 0 | 0 | 0 | 0 |
| | 1 | 0 | 0 | 1 | 0 | 0 | 1 | 1 | 1 | 1 | 0 | 0 | 0 | 0 | 0 | 0 | 0 | 0 | 0 | 0 | 0 | 0 |
| | 1 | 0 | 0 | 1 | 0 | 1 | 1 | 1 | 1 | 1 | 1 | 0 | 0 | 0 | 0 | 0 | 0 | 0 | 0 | 0 | 0 | 0 |
| | 1 | 0 | 0 | 1 | 1 | 0 | 1 | 1 | 1 | 1 | 1 | 1 | 0 | 0 | 0 | 0 | 0 | 0 | 0 | 0 | 0 | 0 |
| | 1 | 0 | 0 | 1 | 1 | 1 | 1 | 1 | 1 | 1 | 1 | 1 | 1 | 0 | 0 | 0 | 0 | 0 | 0 | 0 | 0 | 0 |
| | 1 | 0 | 1 | 0 | 0 | 0 | 1 | 1 | 1 | 1 | 1 | 1 | 1 | 1 | 0 | 0 | 0 | 0 | 0 | 0 | 0 | 0 |
| | 1 | 0 | 1 | 0 | 0 | 1 | 1 | 1 | 1 | 1 | 1 | 1 | 1 | 1 | 1 | 0 | 0 | 0 | 0 | 0 | 0 | 0 |
| | 1 | 0 | 1 | 0 | 1 | 0 | 1 | 1 | 1 | 1 | 1 | 1 | 1 | 1 | 1 | 1 | 0 | 0 | 0 | 0 | 0 | 0 |
| | 1 | 0 | 1 | 0 | 1 | 1 | 1 | 1 | 1 | 1 | 1 | 1 | 1 | 1 | 1 | 1 | 1 | 0 | 0 | 0 | 0 | 0 |
| | 1 | 0 | 1 | 1 | 0 | 0 | 1 | 1 | 1 | 1 | 1 | 1 | 1 | 1 | 1 | 1 | 1 | 1 | 0 | 0 | 0 | 0 |
| | 1 | 0 | 1 | 1 | 0 | 1 | 1 | 1 | 1 | 1 | 1 | 1 | 1 | 1 | 1 | 1 | 1 | 1 | 1 | 0 | 0 | 0 |
| | 1 | 0 | 1 | 1 | 1 | 0 | 1 | 1 | 1 | 1 | 1 | 1 | 1 | 1 | 1 | 1 | 1 | 1 | 1 | 1 | 0 | 0 |
| | 1 | 0 | 1 | 1 | 1 | 1 | 1 | 1 | 1 | 1 | 1 | 1 | 1 | 1 | 1 | 1 | 1 | 1 | 1 | 1 | 1 | 0 |
| | 1 | 1 | X | X | X | X | 1 | 1 | 1 | 1 | 1 | 1 | 1 | 1 | 1 | 1 | 1 | 1 | 1 | 1 | 1 | 1 |

| | | 29⌐ 2 | | |
|---|---|---|---|---|
| D: | A0 · · | Ai · · · | Ai+1··Ak · · · | An-1 |

| | | | 29 | | |
|---|---|---|---|---|---|
| C: | · · · An-1 A0 · · | Ai · · · · | Ai+l · · | | S=k-i |

M: | 1 · · · · · · · · · · · · 1 | 0 · · 0 |   MGa ADD=k+l
                                             E1E2=10

L: | 0 · · · · · · · 0 | 1 · · · · · · · 1 |   MGb ADD=k
                                              E1E2=01

Y: | 0 · · · · · · · 0 | Ai · · Ai+l-1 | 0 · · 0 |   (29)

B: | B0 · · · · · · · · · | Bk · · · | · · Bn-1 |   (31)

Q: | 0 · · · · · · · · · · 0 | 1 · · 1 |   MGc ADD=k+l
                                           E1E2=01

P: | 1 · · · · · · · 1 | 0 · · · · · · · 0 |   MGd ADD=k
                                              E1E2=10

SHIFT NETWORK HAVING A MASK GENERATOR AND A ROTATOR

CROSS REFERENCE TO RELATED APPLICATION

In copending application, Ser. No. 618,269, U.S. Pat. No. 4,012,722 for "A HIGH SPEED MODULAR MASK GENERATOR," filed Sept. 30, 1975 in the names of D. D. Gajski and B. R. Tulpule and assigned to the assignee of the present invention, there is described and claimed a specific modular high speed mask generating apparatus. Although not limited thereto, the present invention employs in its preferred embodiment such an apparatus.

BACKGROUND OF THE INVENTION

It is difficult to imagine any scientific computation without a floating-point arithmetic. Today's hardware costs have approached the point where a hardware implementation of a floating-point, arithmetic-logic unit is not only feasible but economically practical. In such a unit, a high-speed shifting network is a necessity for pre-normalization in unnormalized, floating-point, for arithmetic alignment of one of the mantissas in floating-point addition and subtraction, for post-normalization of the resultant mantissa in any normalized, floating-point operation, and for shifting partial results during the multiply and divide operations. The same network may be used for field manipulations such as extraction and isolation of fields during emulation of various machines, or insertion and transfer of fields during packing and unpacking.

Arithmetic operations require mostly right and left end-off shifts. Although every field manipulation can be obtained through a sequence of left and right end-off shifts and logical operations, a high-speed, arithmetic-logic unit requires a circular shift and masking capabilities to achieve speed of arithmetic operations in field-manipulation operations. On the other hand, todays standardized logic families are not well equipped with circuits that can be used as building blocks in design of left and right end-off shifters. Uniform shift networks that can shift an arbitrary number of places are usually implemented as one or more levels of multiplexers or selectors, see Davis, R. L., "Uniform Shifting Networks," Computer, 1974 Vol. 7, pp. 60–71, September 1974. Such a network is basically connected as a circular shifter with insertion of the proper number of zeroes (ones) on the left-most portion of the data word when right end-off shift is required and vice-versa when left end-off shift is required. Insertion of zeroes (ones) is distributed across the entire shifting network, and requires disabling of certain multiplexer outputs. The number of multiplexer outputs and their positions is different at each level and depends on shift amount and the direction of shifting. Further, it is not only difficult to determine the multiplexer outputs to be disabled, but also available MSI multiplexer packages do not provide an enable control for every output. If there is enable capability at all, it is applicable to all outputs.

OBJECTS AND SUMMARY OF THE INVENTION

It is therefore an object of the present invention to provide a modular uniform shifting network suitable for integrated circuit technology.

It is another object of the present invention to provide a uniform shifting network having a structured architecture for maximum flexibilty.

It is still another object of the present invention to provide a uniform shifting network readily adaptable to various hardware configurations for optimizing tradeoffs between hardware complexity and operational speed.

The above and other objects of the present invention are achieved by a uniform shifting network configuration which separates the basic shifting function into two basic hardware sub-functions; rotation and mask vector generation. Further, the invention provides modular rotation and mask generation hardware for increased flexibility in implementation and operation. A structured architecture is thus provided wherein the uniform shifting network of the present invention comprises basic functional blocks having functions which are dynamically controllable.

DESCRIPTION OF THE DRAWINGS

The above-mentioned and other objects, advantages and features of the present invention will become more readily apparent from a review of the following specification taken together with the drawings wherein:

FIG. 2B is a truth table illustrating the function of the mask generator of FIG. 2A;

FIG. 7 is a flow diagram of the two-step field transfer operation implementable with the hardware of FIG. 6;

FIG. 9 is a flow chart of the one-step field transfer operation implementable by the hardware of FIG. 8;

FIG. 12 is a flow chart illustrating the extended shift operation implementable by the hardware of FIG. 11.

BRIEF DESCRIPTION OF THE INVENTION

Figure 1:
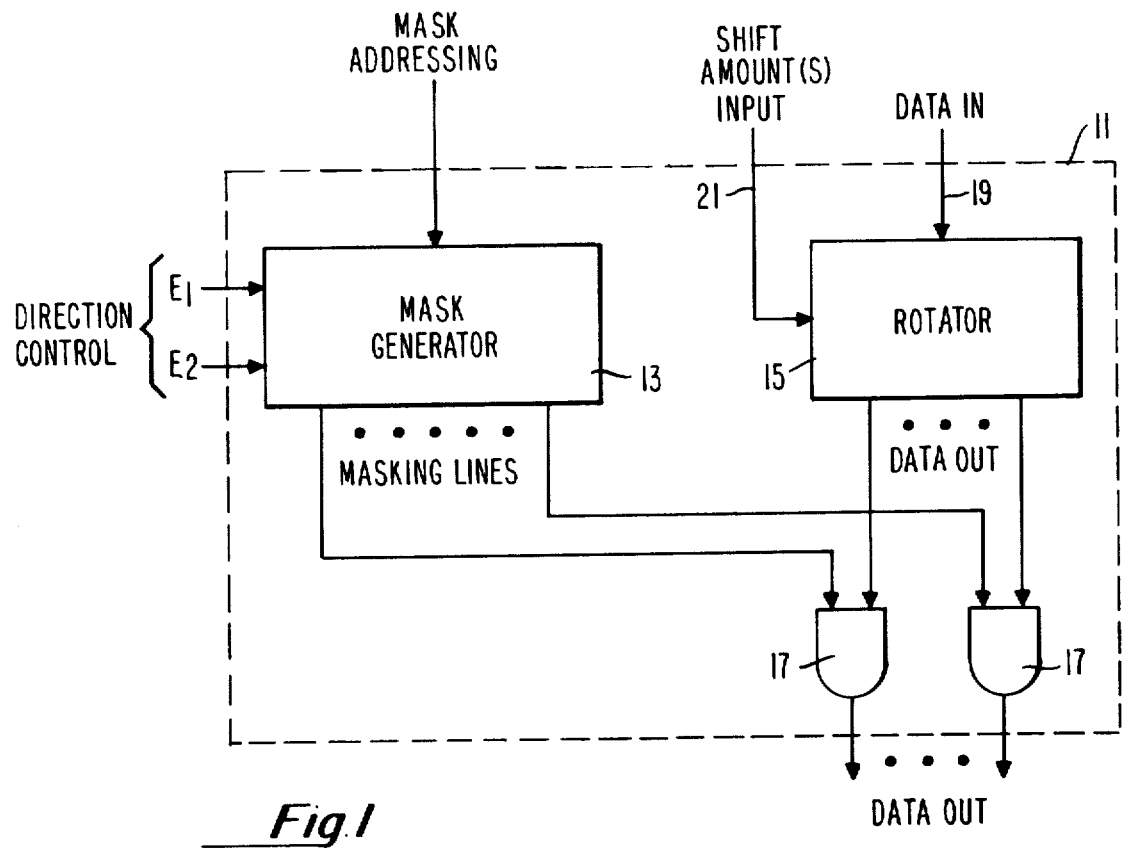
FIG. 1 is a block diagram of the basic shifting network of the present invention demonstrating the separation of masking and rotating functions.

The basic shift network 11 of the present invention consists of two primary parts, a mask generator 13 and a rotator 15 with the outputs thereof being combined in a plurality of AND circuits 17, see FIG. 1. The rotator 15 is a uniform network that rotates a basic data word present at data input 19 the number of places specified by a shift amount control word present at shift amount input 21. The mask generator 13 generates mask vectors, see above-cited application, Ser. No. 618,269 U.S. Pat. No. 4,012,722.

In a right-end-off shift the mask generator 13 generates a field of zeroes whose length is specified by a shift amount word followed by a string of ones. In a left-end-off shift the number of zeroes specified by the shift amount word is preceded by the string ones. In an end-around shift the mask generator 13 produces a word of all ones. The generation of zeroes by the mask generator 13 is performed in parallel with the rotation performed by rotator 15 which is thereby increasing the functional speed of the overall basic shift network 11. The separation of the mask generating function and the rotating function results in an overall simplicity, with the rotator 15 consisting only of two or three multiplexing levels. Modularity is preserved under any length of data word, and extensions are achieved simply by paralleling mask generator 13 and rotator 15 units. In the above-cited application, Ser. No. 618,269, now U.S. Pat. No. 4,012,722, details are given regarding the modularity and expandability of the basic mask generator 13.

In order to facilitate better understanding of the invention, a detailed description of the mask generator 13 will be presented, followed by a detailed description of the rotator 15 and by a description detailing the basic shift network 11 combination of the mask generator 13 and the rotator 15 to perform field transfer and shift extension operations.

Figure 2A:
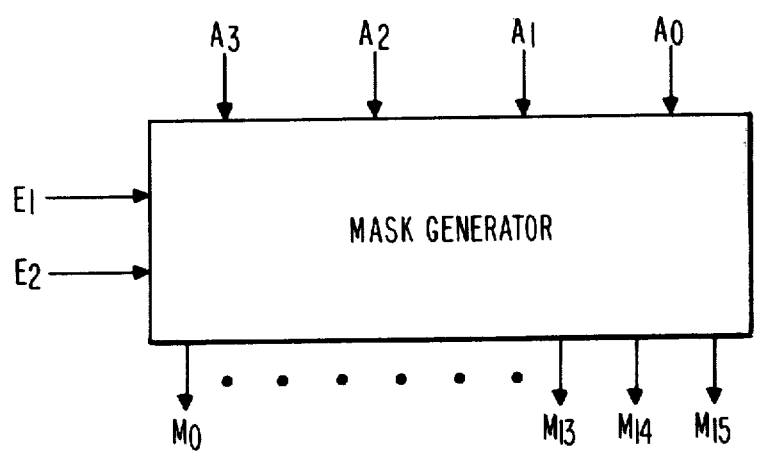
FIG. 2A is a block diagram of a mask generator used in the network of FIG. 1.

Referring to FIG. 2A, the mask generator 13 of the present invention includes a plurality of input address lines (A0-A3) a plurality of output masking lines (M0-M15), a first control line E1, and a second control line E2. The input address lines receive in parallel binary numerical data with input address line A0 receiving the least significant bit, address line A1 receiving the next least significant bit, address line A2 receiving the second most significant bit, and input address line A3 receiving the most significant address bit. As will be detailed hereinafter, mask generators may be fabricated with more or fewer input address lines. The mask generator 13 also includes a plurality of output masking lines references M0 through M15 consecutively. The number of output lines for a given mask generator 13 is equal to two (2) raised in power to the number of input address lines. For A0 through A3 there are 16 output masking lines M0 through M15.

The logic levels appearing on the output masking lines M0 through M15 depend upon the binary numerical data present on the input address lines A0 through A3 and the logic levels on the first and second control lines E1 and E2, see FIG. 2B. When both E1 and E2 are at logical zero the output masking lines M0 through M15 are also at logical zero regardless of the binary numerical data present at the input address lines A0 through A3. Likewise, when both E1 and E2 are at a logical one level the output masking lines M0 through M15 are all at a logical one level regardless of the binary numerical data present on the input address lines A0 through A3. With a logical zero level on the first control line E1 and a logical one level present on the second control line E2, the logic levels on the output masking lines M0 through M15 are a function of the binary numerical data present at the input address lines A0 through A3. When the input binary numerical data is zero, a logical one level is present on all output masking lines M0 through M15. A binary numerical value of one (a logical one on input address line A0 and a logical zero on input address lines A1 through A3) generates a logical one level on output masking lines M0 through M14 and a logical zero on output masking line M15. An input binary representation of two (A1 at one, and A0, A2, A3 at zero) generates a logical one level on output masking lines M0 through M13 and a logical zero level on output masking lines M14 and M15. This pattern is continued down through a binary representation of fifteen (a logical one level present on all input address lines A0 through A3) wherein a logical one level is present on output masking line M0 and a logical zero level is present on masking lines M1 through M15.

When the first control line E1 is at a logical one level and the second control line E2 is at a logical zero level, a binary representation of zero on the input address lines A0 through A3 generates all zeroes on output masking lines M0 through M15. An input binary address representation of one (1) generates a logical one on output masking line M15 and logical zero levels on output masking lines M0 through M14. A binary representation of two (2) at the input address lines A0 through A3 generates a logical one level on output masking lines M14 and M15 and a logical zero level on output masking lines M0 through M13. This pattern is continued down to the binary representation of fifteen (15) wherein output masking line M0 is at logical zero and output masking lines M1 through M15 are at logical one.

As mentioned, the mask generator 13 may be fabricated with more or less than the four input lines A0 through A3. However, since the number of output masking lines is equal to two (2) raised in power to the number of address input lines, the number of connection pins or terminals that would be required in an integrated circuit fabrication of a mask generator 13 having six or more address lines would be rather excessive with regard to present day integrated circuit packaging technology. Therefore, mask generators 13 having between three and five input address lines are generally preferred for integrated circuit fabrication.

Figure 3:
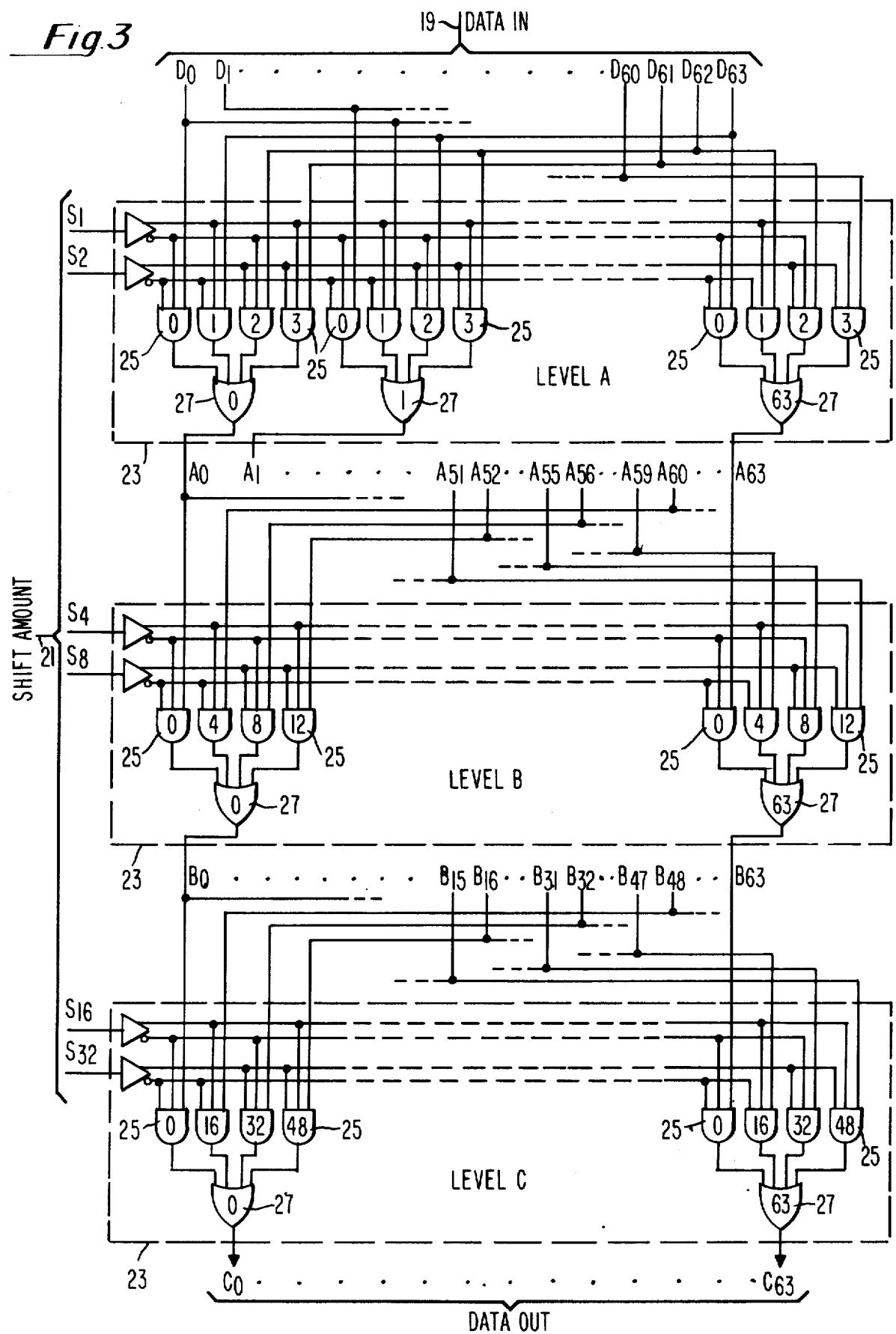
FIG. 3 is a logic diagram of a rotator used in the basic shift network of FIG. 1.

Referring now to FIG. 3, the rotator 15 of the present invention rotates a data word present at the data input 19 to the right or left by an amount specified by a shift amount control word at the shift amount input 21. For a data input word of sixty-four (64) bits (D0–D63) and a shift amount control word of six (6) bits (S1, S2, S4, S8, S16, and S32), three levels of multiplexers 23 (designated level A, level B and level C) are used to generate a shifted data output of sixty-four bits (designated as C0–C63). The sixty-four bit data input word is rotated to the right by zero, one, two or three places in level A; zero, four, eight or twelve places in level B, and zero, sixteen, thirty-two or forty-eight places in level C in FIG. 3. The numbers in the AND gates 25 specify the rotation amount and the numbers in the OR gates 27 are output indices. For a general discussion on uniform shift networks see Davis, R. L., "Uniform Shifting Networks," Computer 1974, Vol. 7, pp 60–71, September 1974.

Figure 4:
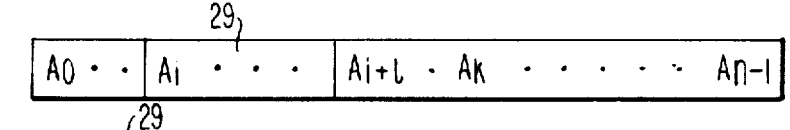
FIG. 4 is a flow chart of a four-step field transfer operation using the separate rotation and masking operations of the present invention.

The rotator 15 may be used in operations involving field manipulations, see FIG. 4. A general field transfer consists of the extraction of a continuous string of 1 bits hereinafter called the source field 29 from a source word (A) having n bits followed by insertion of the source field 29 into a destination word (B). The operation is specified by the following: the address (i) of the left-most bit in source field 29; the address (k) of the left-most bit in a destination field 31; and the length (1)

of the source field 29. The field transfer is performed in a step or series of steps in which data fields are rotated by rotator 15, isolated by the mask generator 13, and inserted by logic operations.

The field transfer may be performed in a four-step operation as illustrated in the flow chart of FIG. 4. In the first step, the source word A is rotated to the right by the amount $S = n - i$ so that the source field 29 is left justified. In the second step, the isolated source field 29 is aligned with the destination field 31. In the third step, the destination word B also of n bits in length, is rotated to the right ($S = n - k$) and the left justified destination field 31 is blanked out. In the last step, the remaining bits of destination word are returned to their initial position by right rotation ($S = k$).

Figure 5:
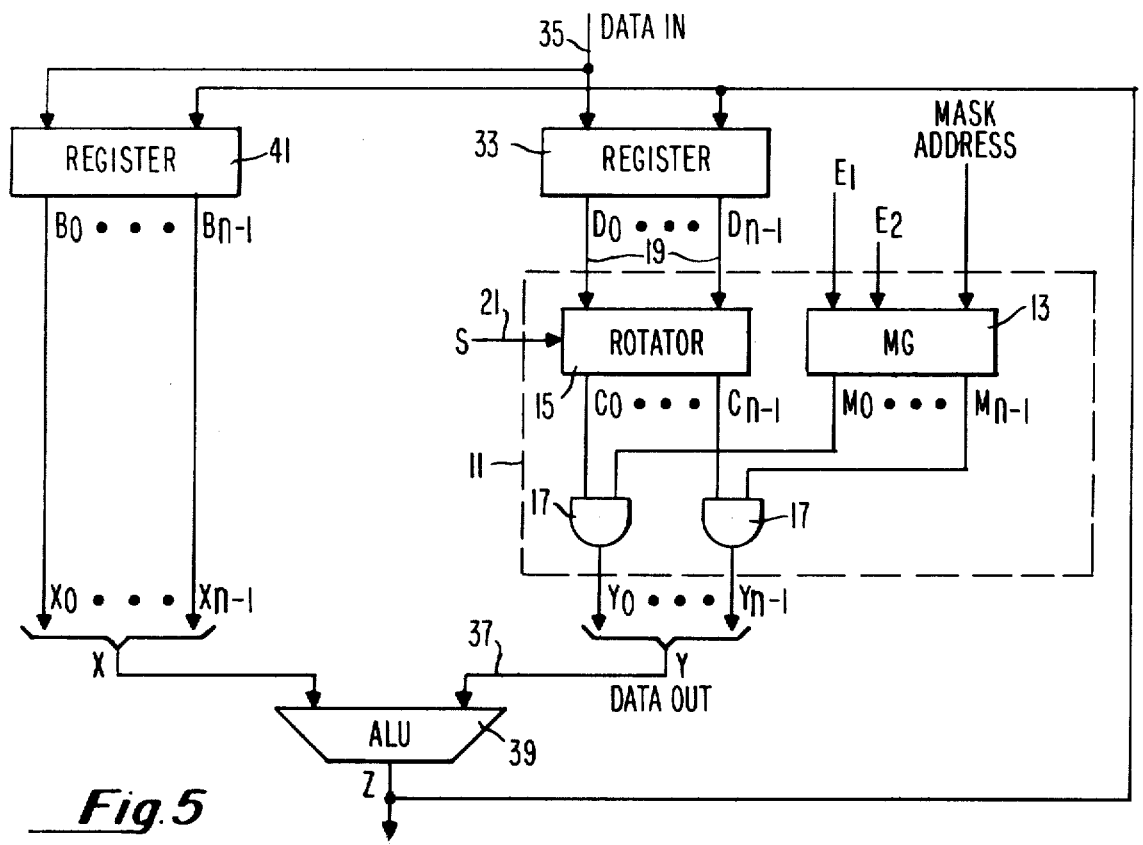
FIG. 5 is a block diagram of the hardware used to implement the four-step field transfer operation of FIG. 4.

Hardware for implementing the above-described four-step field transfer is illustrated in FIG. 5. The source word A is fed into a first register 33 via a data input channel 35. With reference to FIG. 4 and FIG. 5, it is appreciated that in the first step of the four-step field transfer, the source word A is read from register 33 into the rotator 15 wherein it is rotated to the right by the amount $n - i$ by supplying to the shift amount input 21 the value $n - i$ wherein n is equal to the number of bits in the source word A and i is equal to the address of the lower leftmost bit in the source field 29. At the same time, the mask generator 13 is addressed by source field 29, length (l) and the E1 and E2 direction control inputs are fed with a logical 1 0 signal. By combining the outputs of the rotator 15 and the mask generator 13 in AND gates 17, a data output identified as $Y_0$ through $Y_{n-1}$ is generated and fed to a first input 37 of an arithmetic logic unit (ALU) 39. The ALU 39 need be only a very simple logical element to perform the processing required in the preferred embodiment. With continued reference to FIG. 4, it can be seen that for step one the input 37 of the ALU 39 is fed directly through to the Z output of the ALU 39.

At the conclusion of step one the Z output of the ALU 39 is fed back into the register 33. In step two the data in register 33 is fed into the rotator 15 and shifted by the amount k. Simultaneously, the mask generator 13 is set to produce an output of all logical ones by setting E1, E2 to 1 1. The output of the basic shift network 11 for step two produces at the Y output thereof a word of all zeroes except for the shifted data source field 29. The Y output of the basic shift network 11 is fed into the first input 37 of ALU 39 and outputted directly on the Z output thereof and may at this time be fed into a second register 41 for storage. Alternatively, the ALU 39 may itself store the data word. Also at this time, the destination word B is fed into register 33.

In step three the destination word B is read from register 33 and rotated in rotator 15 by the amount $n - k$. Simultaneously, the mask generator 13 outputs a value of zeroes equal in number to length (l) followed to the right by one's. After combining the rotator 15 output and the mask generator 13 output in AND gates 17 the Y output thereof is fed into the first input 37 of the ALU 39 and outputted on the Z output thereof to be fed back into first register 33.

In step four the output of register 33 is rotated by the amount k by rotator 15 and the mask generator 13 outputs a word comprising of all one's. The output of the mask generator 13 and the rotator 15 are combined in AND gates 17 and the Y output thereof is combined in ALU 39 with the X output of register 41 to produce the desired destination word having the source field 29 inserted in place of the former destination field 31.

Figure 6:
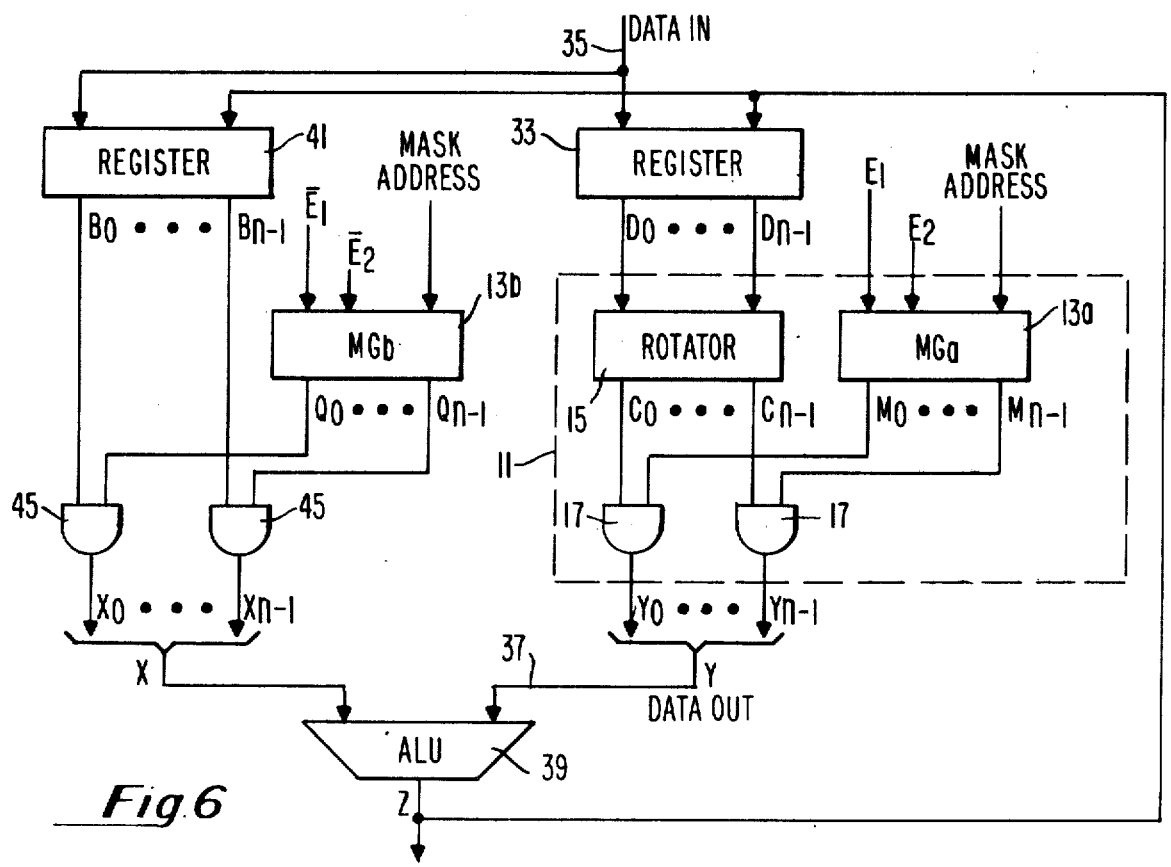
FIG. 6 is a block diagram of hardware using the present invention to perform a two-step field transfer operation.
Figure 7:
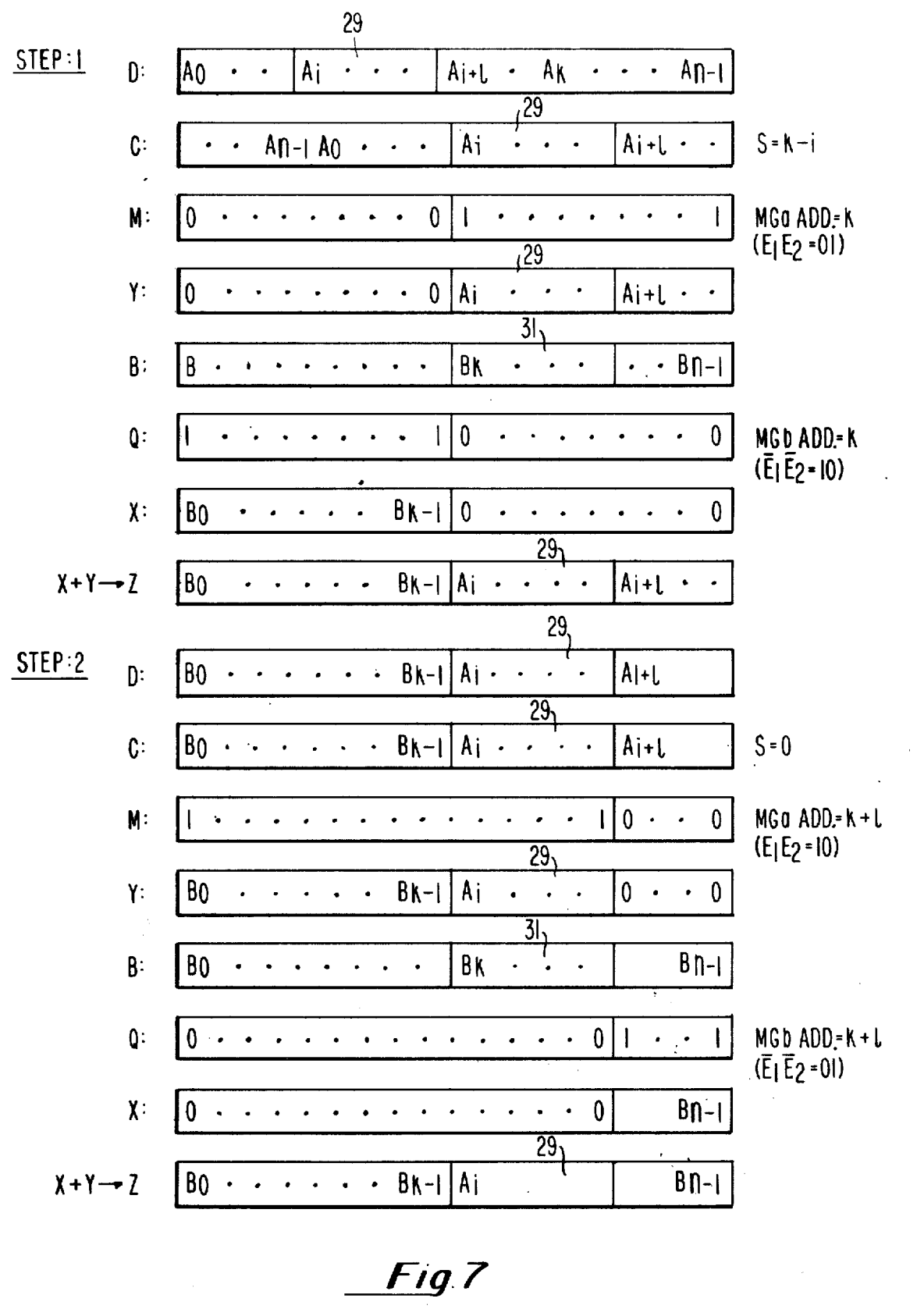

With the addition of a second mask generator 13b outputting to AND gates 45 which combine the output of the mask generator 13b and the output of register 41, the above-described field transfer procedure may be accomplished in two rather than four steps, see FIG. 6 and FIG. 7. In the two-step field transfer approach, FIG. 7, a field of n-k bits of source word A, starting from the first bit of the source field 29, is aligned and inserted into the destination word B in step one. In step two the rightmost k − 1 bits of destination word B are reinstated. The precise logical operations performed in each of the two steps are clearly illustrated in FIG. 7.

Figure 8:
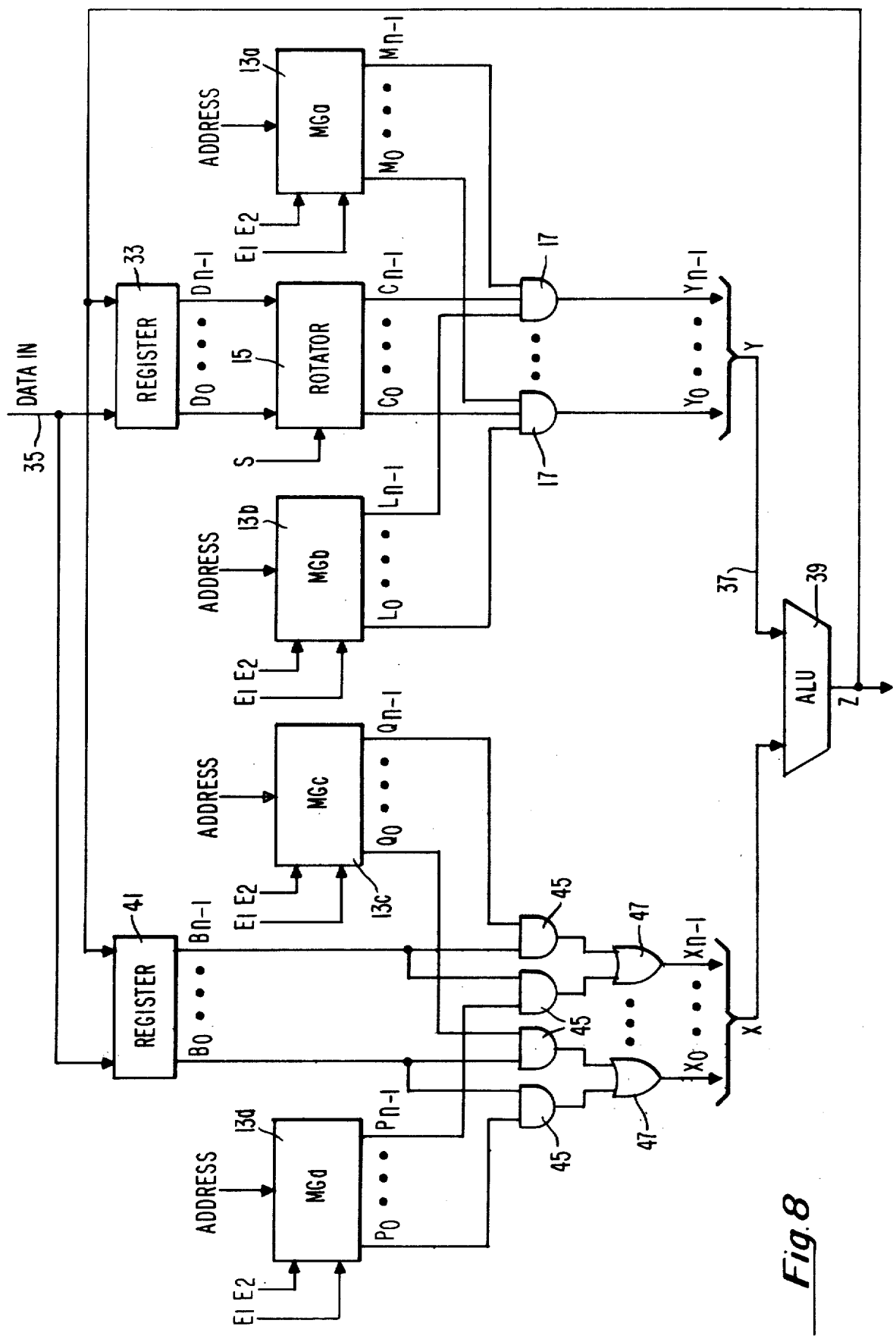
FIG. 8 is a block diagram of hardware separating the masking and rotating functions to perform a one-step field transfer operation.

The field transfer may further be reduced to a one-step procedure through the addition of a third and fourth mask generator (13c and 13d) and by combining the outputs of AND gates 45 via OR gates 47, see FIG. 8. The single step field transfer flow chart is shown in FIG. 9 in a manner similar to which the two-step flow chart is illustrated in FIG. 7 and the four-step field transfer flow chart is illustrated in FIG. 4. In the single step approach the isolation and insertion of the source field 29 into the destination field 31 is performed in a single step.

Thus, by splitting the field transfer procedure into separate rotating and masking functions great flexibility arises not only providing modular components but also by permitting readily attainable trade-offs between added hardware costs and the number of steps required for each field transfer.

Further, the separation of the rotating and masking functions permit shift extension to be performed in an economical manner. Floating-point operations with extended precision may require the shifting of an n bit word anywhere in a field of 2n bits. This may be accomplished by extending the rotator. However, extension of the rotator network increases the number of packages, because both number of multiplexers required in each level as well as the number of levels must be increased. (In general, for an n-bit rotator containing r levels of multiplexers and s multiplexers per level, the extension to 2n bits increases the number of packages from r times s to approximately $2(r + 1) \times s$ or $2 r x s$ depending on the new number of levels). A less expensive solution is obtained in the present invention by extending the mask array. The shifting of an n-bit word by an arbitrary amount can then be done by using many mask generators and a single n-bit rotator. The necessary increase in the number of mask generator circuits required is always much smaller than s (the number of multiplexers used at each level in the rotator).

Figure 10:
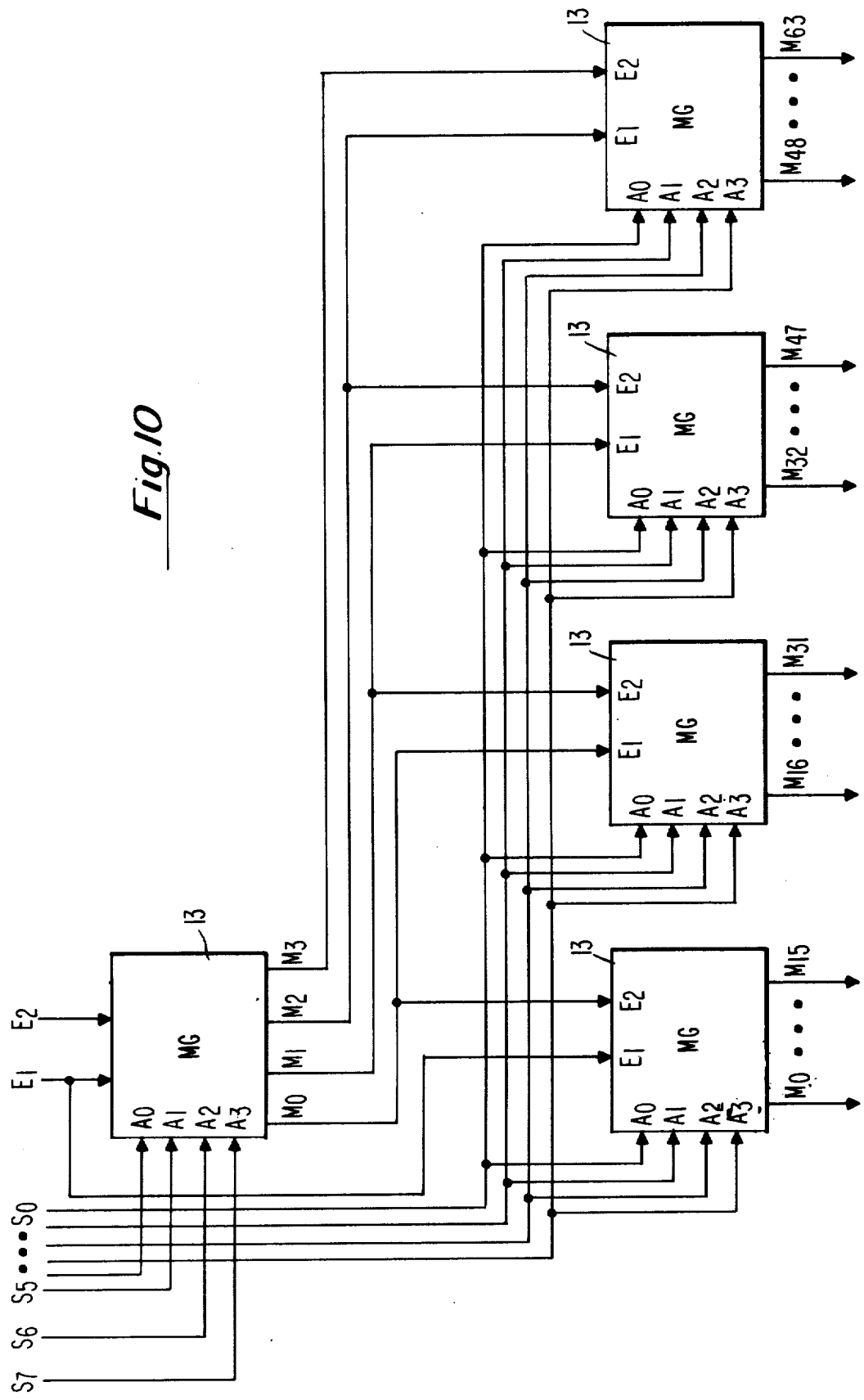
FIG. 10 is a block diagram illustrating the modularity of the mask generator used in the present invention to provide a masking vector of 64 bits.

The mask generator 13 of the present invention may be easily expanded modularly from a simple unit having four inputs and sixteen outputs, see FIG. 2, to a more complex array comprising eight inputs and sixty-four outputs, see FIG. 10. The sixty-four bit mask generator of FIG. 10 will be used in the below-described embodiments involving shift extension.

Figure 11:
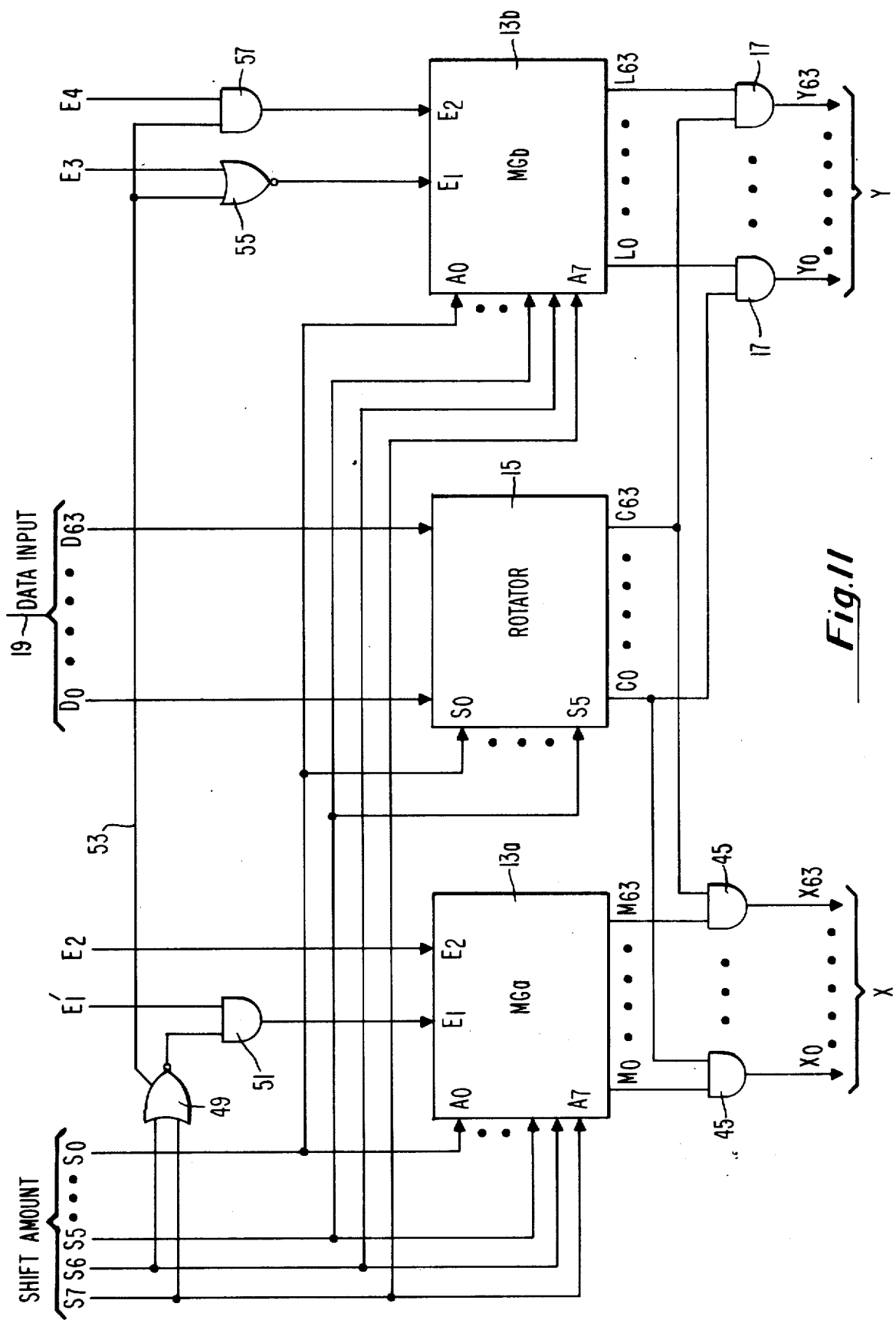
FIG. 11 is a block diagram of a shift extension configuration using the separate rotating and masking functions of the present invention.
Figure 12:
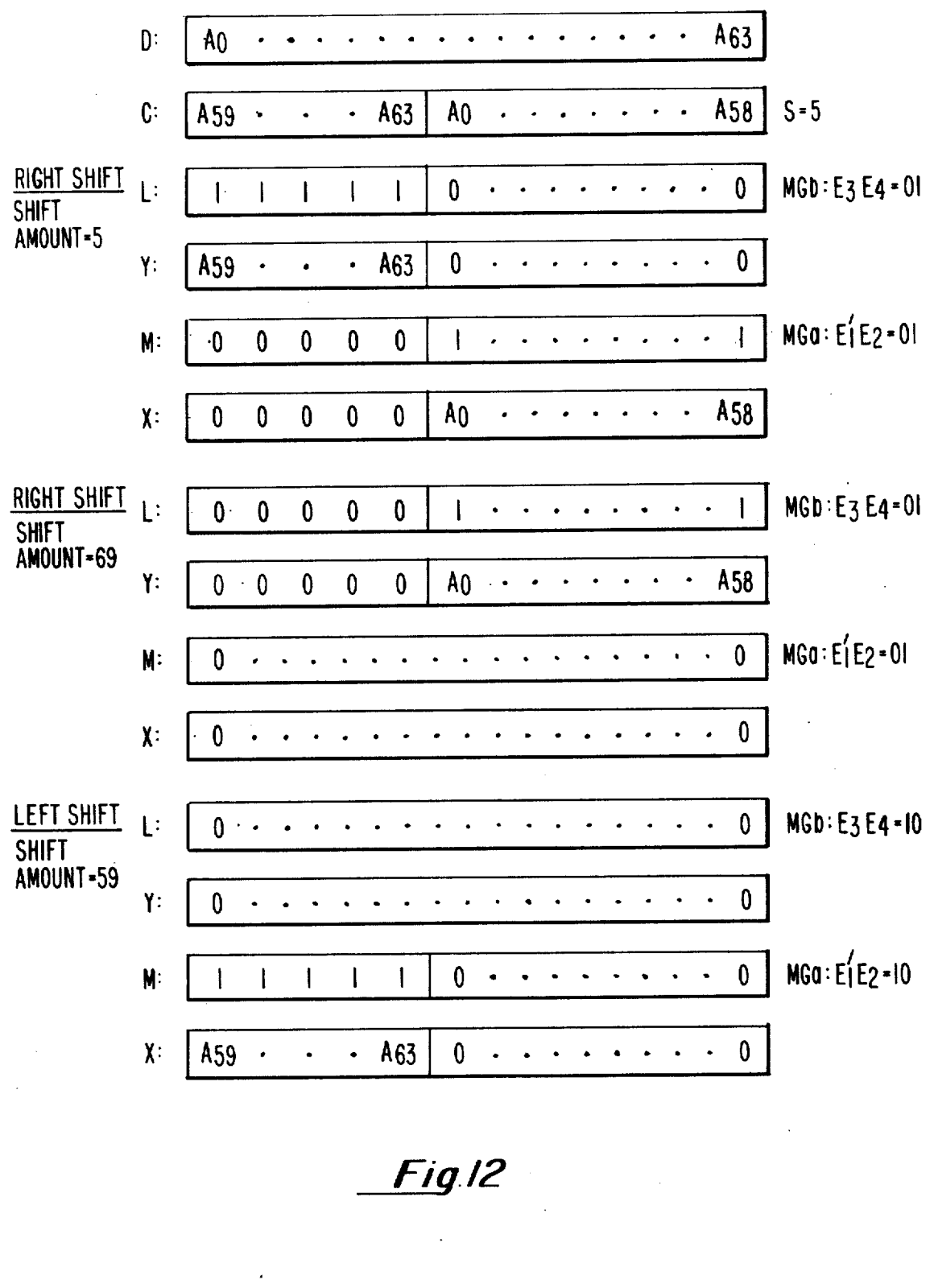

The simple functions of rotating and masking may be used in shift extension wherein two 64 bit mask generators (13a and 13b) are used for shifting a 64 bit word within a 128 bit resultant field consisting of X the upper half of the 128 bit field and Y the lower half thereof, see FIG. 11. The shift amount S is an 8-bit binary number from which only the least significant six bits are used to specify the rotation amount. For shift right operations (E1, E2 = 01), mask generator 13a generates a string of S zeroes which is ANDed with the rotated word C. This produces in X the right-justified, most significant 64-S bits of D. The output of mask generator 13*b* generates a string of ones which produces in Y the left-justified, least significant S bits of D. When S is greater than or equal to 64, mask generator 13*b* generates a string of 64-S zeroes followed by ones. The field Y now contains the most significant 64-S bits of D, see FIG. 11 and FIG. 12. The concatenation of fields X and Y yields a right-shifted 64 bit word in a 128 bit field.

For shift left operations (E1, E2 = 10; E3, E4 = 10), mask generator 13*a* generates a string of 64-S ones (S less than 64) or all zeroes (S greater than or equal to 64). The field X then contains the least significant 64-S bits of D (S less than 64) or all zeroes. The Y output always contains all zeroes. The concatenation of fields X and Y yields the left shifted 64 bit word.

As shown in FIG. 11, the shift amount bits $S_0$ through $S_7$ address the two mask generators 13*a* and 13*b* while only bits $S_0$ through $S_5$ are fed to the rotator 15. Bits $S_6$ and $S_7$ feed an NOR gate 49 which in turn provides an input to a two-input AND gate 51. The AND gate 51 has as a second input the control input E1 and outputs to control input E1 of mask generator 13*a*. a direct (non-inverting) output 53 of NOR gate 49 feeds a two-input NOR gate 55 and a two-input AND gate 57. The NOR gate 55 is also inputted by control input E3 and outputs to control input E1 of mask generator 13*b*. The AND gate 57 is also inputted by control input E4 and outputs to control E2 of mask generator 13*b*. The function and operation of the hardware of FIG. 11 is illustrated in the functional flow diagram of FIG. 12.

The uniform shifting network of the present invention involves the decomposing of the basic shifting function into two basic hardware sub-functions: rotation and mask vector generation. In addition to increased speed, simplicity and modularity, a structured architecture has been achieved wherein the uniform shifting network comprises basic functional blocks, which functions are dynamically controllable. The configuration of such a uniform shifting network may be fixed, as shown in the preferred embodiments above, or it may be dynamically altered. It will be appreciated that while only specific embodiments of the present invention and methods of practicing the same have been described and illustrated, changes and modifications therein will be apparent to one skilled in the art, which changes and modifications will nevertheless be within the spirit and scope of the invention as claimed.

What is claimed is:

1. A network for transferring a source field in a source word to a destination field in a destination word comprising:

an input data path for receiving both a plurality of source words, each source word therein having a source field, and a plurality of destination words, each destination word therein having a destination field;

a source register fed by said input data path for temporarily storing an individual source word therein;

a destination register fed by said input data path for temporarily storing an individual destination word therein;

source rotate means fed by said source register for rotating said individual source word temporarily stored therein to bring said source field thereof into corresponding alignment with said destination field of said individual destination word temporarily stored in said destination register;

source mask means fed by said source rotate means for masking all but said source field of said individual source word rotated by said source rotate means;

destination mask means fed by said destination register for masking said destination field of said individual destination word temporarily stored therein; and logic means fed by both said source mask means and said destination mask means for combining said rotated and masked individual source word with said masked individual destination word.

2. The network according to claim 1 wherein said source mask means and said destination mask means each include a modular mask generator.

3. The network according to claim 1 wherein said source mask means and said destination mask means each include a pair of modular mask generators.

* * * * *